US 8,107,964 B2

(12) United States Patent
Nylander et al.

(10) Patent No.: US 8,107,964 B2
(45) Date of Patent: Jan. 31, 2012

(54) AUTOMATIC BUILDING OF NEIGHBOR LISTS IN MOBILE SYSTEM

(75) Inventors: Tomas Nylander, Väarmdö (SE); Jari Vikberg, Järma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 707 days.

(21) Appl. No.: 11/538,077

(22) Filed: Oct. 3, 2006

(65) Prior Publication Data

US 2007/0097938 A1  May 3, 2007

Related U.S. Application Data

(60) Provisional application No. 60/722,983, filed on Oct. 4, 2005, provisional application No. 60/722,984, filed on Oct. 4, 2005, provisional application No. 60/722,982, filed on Oct. 4, 2005, provisional application No. 60/723,946, filed on Oct. 6, 2005, provisional application No. 60/728,780, filed on Oct. 21, 2005, provisional application No. 60/731,495, filed on Oct. 31, 2005.

(51) Int. Cl.
*H04Q 7/20* (2006.01)

(52) U.S. Cl. ..... 455/444; 455/436; 455/403; 455/422.1; 455/443; 455/434; 370/331

(58) Field of Classification Search ............ 455/436, 455/444
See application file for complete search history.

(56) References Cited

U.S. PATENT DOCUMENTS 5,295,153 A  3/1994  Gudmundson
(Continued)

FOREIGN PATENT DOCUMENTS

EP  1 209 940 A1  5/2002
(Continued)

OTHER PUBLICATIONS

U.S. Office Action mailed Dec. 15, 2008 in U.S. Appl. No. 11/538,084.
(Continued)

*Primary Examiner* — Charles Appiah
*Assistant Examiner* — Randy Peaches
(74) *Attorney, Agent, or Firm* — Nixon & Vanderhye, P.C.

(57) ABSTRACT

In a radio access network (24) a femto radio base station (28$_f$) comprises a resident receiver (54) which acquires system information broadcast in a radio access network (24). At least part of the system information is used for building, at the femto radio base station (28$_f$), a neighbor data structure (59) comprising information for neighboring cells. The neighbor data structure (59) is then used for building a neighbor list. The neighbor list is subsequently transmitted from the femto radio base station (28$_f$) to a user equipment unit (30) served by the femto radio base station (28$_f$). In some example embodiments and modes, the femto radio base station (28$_f$) reports the neighbor data structure to a network node (26, 100) other than the femto radio base station. The other node (26, 100) uses the neighbor data structure for building the neighbor list at the other node. In some example embodiments and modes, acquisition of the system information comprises scanning a surrounding macro coverage area of the femto radio base station for obtaining cell identity information for detected cells. In other example embodiments and modes, the acquisition of the system information can additionally comprise camping on a macro cell and using/consulting at least one system information block in the camped-on macro cell is consulted/used for obtaining information about at least one neighboring cell.

11 Claims, 12 Drawing Sheets

U.S. PATENT DOCUMENTS

| | | | |
|---|---|---|---|
| 5,920,818 A | 7/1999 | Frodigh et al. | |
| 5,974,320 A * | 10/1999 | Ward et al. | 455/437 |
| 6,178,327 B1 * | 1/2001 | Gomez | 455/445 |
| 6,289,220 B1 * | 9/2001 | Spear | 455/436 |
| 6,430,414 B1 * | 8/2002 | Sorokine et al. | 455/442 |
| 6,505,043 B1 * | 1/2003 | Aihara | 455/436 |
| 6,532,361 B1 | 3/2003 | Kamperschroer | |
| 6,600,758 B1 * | 7/2003 | Mazur et al. | 370/508 |
| 6,615,035 B1 | 9/2003 | Lucidarme et al. | |
| 6,853,627 B1 | 2/2005 | Evans | |
| 6,993,359 B1 | 1/2006 | Nrushimha et al. | |
| 7,003,297 B2 * | 2/2006 | Willars et al. | 455/436 |
| 7,054,638 B2 | 5/2006 | Rune et al. | |
| 7,072,656 B2 | 7/2006 | Willars et al. | |
| 7,072,663 B2 | 7/2006 | Ramos et al. | |
| 7,145,890 B1 | 12/2006 | Seo et al. | |
| 7,295,812 B2 | 11/2007 | Haapoja et al. | |
| 7,366,542 B2 | 4/2008 | Schmidt | |
| 2002/0094817 A1 | 7/2002 | Rune et al. | |
| 2002/0111180 A1 | 8/2002 | Hogan et al. | |
| 2002/0123348 A1 | 9/2002 | Willars et al. | |
| 2002/0131387 A1 * | 9/2002 | Pitcher et al. | 370/338 |
| 2002/0151304 A1 | 10/2002 | Hogan | |
| 2002/0187793 A1 | 12/2002 | Papadimitriou et al. | |
| 2003/0013443 A1 * | 1/2003 | Willars et al. | 455/432 |
| 2003/0119501 A1 | 6/2003 | Kim | |
| 2003/0214925 A1 | 11/2003 | Diaz Cervera et al. | |
| 2004/0053606 A1 | 3/2004 | Artamo et al. | |
| 2004/0053630 A1 | 3/2004 | Ramos et al. | |
| 2004/0057420 A1 | 3/2004 | Curcio et al. | |
| 2004/0092259 A1 | 5/2004 | Blanc et al. | |
| 2004/0132486 A1 | 7/2004 | Halonen et al. | |
| 2004/0157600 A1 | 8/2004 | Stumpert et al. | |
| 2004/0203346 A1 | 10/2004 | Myhre et al. | |
| 2004/0203737 A1 | 10/2004 | Myhre et al. | |
| 2004/0203800 A1 | 10/2004 | Myhre et al. | |
| 2004/0204097 A1 * | 10/2004 | Scheinert et al. | 455/561 |
| 2004/0258070 A1 | 12/2004 | Arima | |
| 2005/0157673 A1 | 7/2005 | Verma et al. | |
| 2005/0201281 A1 | 9/2005 | Damnjanovic et al. | |
| 2005/0202828 A1 * | 9/2005 | Pecen et al. | 455/453 |
| 2005/0239453 A1 | 10/2005 | Vikberg et al. | |
| 2006/0040664 A1 | 2/2006 | Murray et al. | |
| 2006/0246899 A1 | 11/2006 | Buckley et al. | |
| 2007/0097939 A1 | 5/2007 | Nylander et al. | |
| 2007/0097983 A1 | 5/2007 | Nylander et al. | |
| 2007/0105527 A1 | 5/2007 | Nylander et al. | |
| 2007/0105568 A1 | 5/2007 | Nylander et al. | |
| 2007/0121540 A1 | 5/2007 | Sharp et al. | |
| 2008/0070565 A1 * | 3/2008 | Maeda | 455/424 |

FOREIGN PATENT DOCUMENTS

| | | |
|---|---|---|
| EP | 1 351 530 A1 | 10/2003 |
| EP | 1 363 468 A1 | 11/2003 |
| EP | 1 549 097 A1 | 6/2005 |
| GB | 2 428 942 A | 2/2007 |
| WO | 98/25431 A1 | 6/1998 |
| WO | 99/41932 | 8/1999 |
| WO | 01/80582 A2 | 10/2001 |
| WO | 02/065808 A1 | 8/2002 |
| WO | 03/105380 A1 | 12/2003 |
| WO | 2004/039111 A1 | 5/2004 |
| WO | 2004/040938 A1 | 5/2004 |
| WO | 2005/065214 A2 | 7/2005 |
| WO | 2005/079087 A1 | 8/2005 |
| WO | 2005/086421 A1 | 9/2005 |
| WO | 2005/012101 A1 | 12/2005 |

OTHER PUBLICATIONS

U.S. Office Action mailed Nov. 25, 2008 in U.S. Appl. No. 11/538,081.

U.S. Office Action mailed Dec. 8, 2008 in U.S. Appl. No. 11/538,080.

U.S. Office Action mailed Dec. 30, 2008 in U.S. Appl. No. 11/538,078.

U.S. Office Action mailed Sep. 12, 2008 in U.S. Appl. No. 11/380,824.

International Search Report and Written Opinion mailed May 9, 2007 in corresponding PCT application PCT/SE06/050373.

International Search Report and Written Opinion for PCT/SE2006/050367 mailed Feb. 9, 2007.

Menolascino et al, "Third Generation Mobile Systems Planning Issues", Vehicular Technology Conference, 1998, VTC 98, 48$^{th}$ IEEE Ottawa, Ont., Canada, May 18-21, 1998, New York, NY, USA, IEEE, US ISBN 0-6\7803-4320-4, pp. 830-834, esp. Section II F.

International Search Report and Written Opinion mailed Feb. 27, 2007 in PCT application No. PCT/SE2006/050371.

U.S. Appl. No. 11/538,081, entitled "Access Control in Radio Access Network Having PICO Base Stations", filed Oct. 3, 2006.

U.S. Appl. No. 11/380,824, filed Apr. 28, 2006, entitled "Dynamic Building of Monitored Set".

International Search Report and Written Opinion mailed Mar. 29, 2007 in PCT application PCT/SE2006/050355.

International Search Report and Written Opinion mailed Feb. 27, 2007 in PCT application PCT/SE2006/050370.

Shin et al, "Packet Scheduling Over a Shared Wireless Link for Heterogeneous Classes of Traffic", IEEE Communications Society, © 2004 IEEE, pp. 58-62.

\* cited by examiner

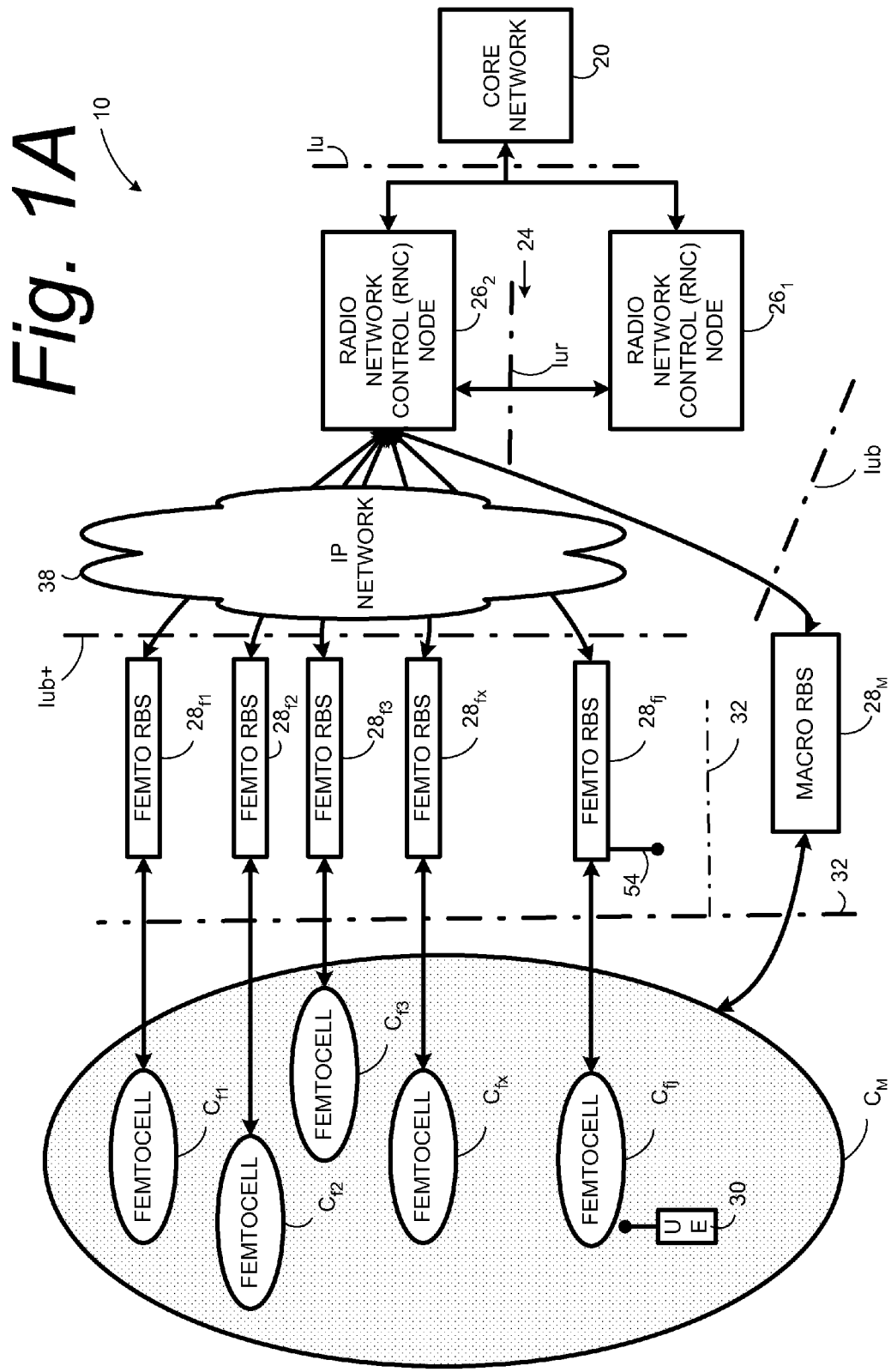

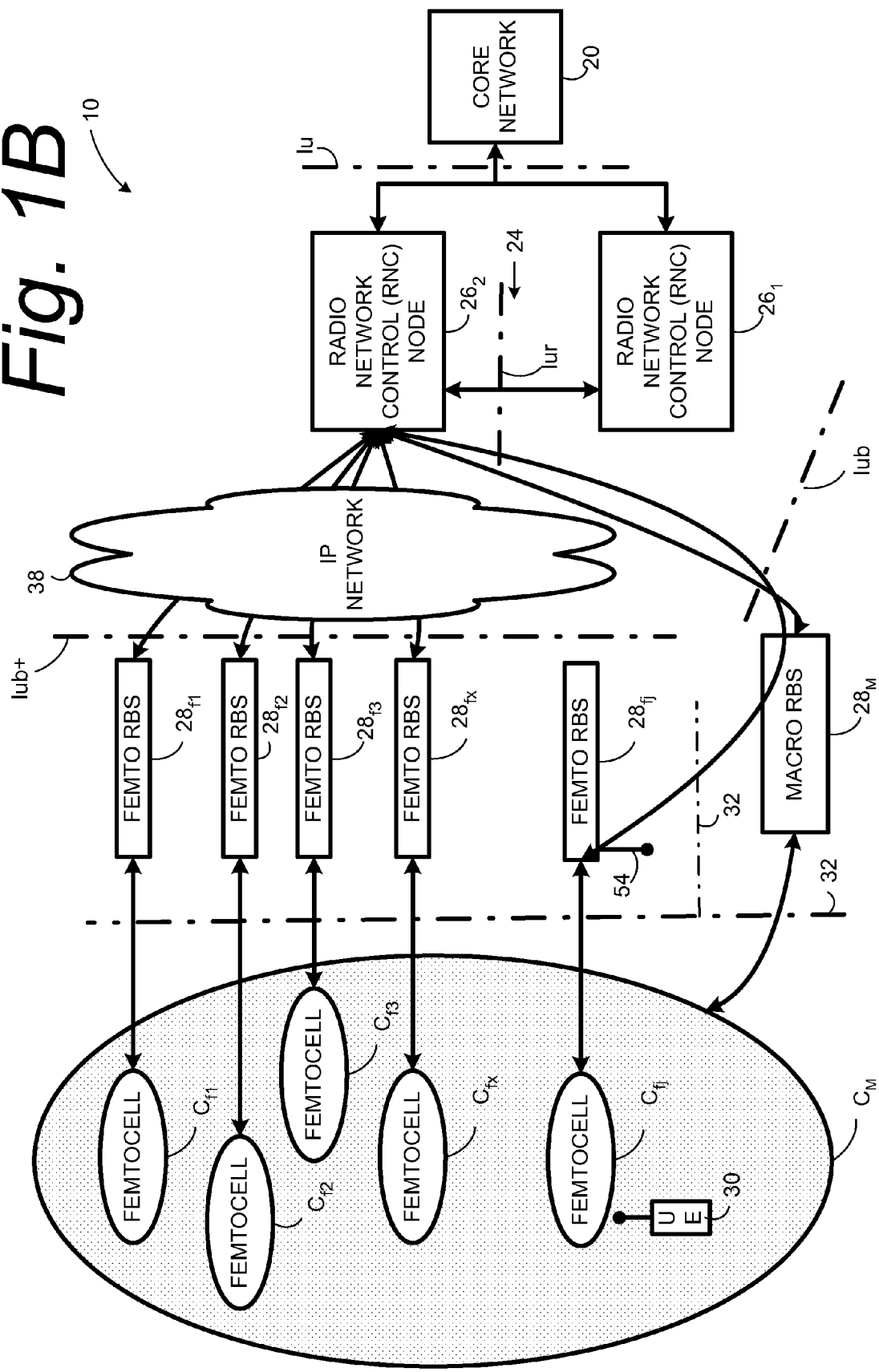

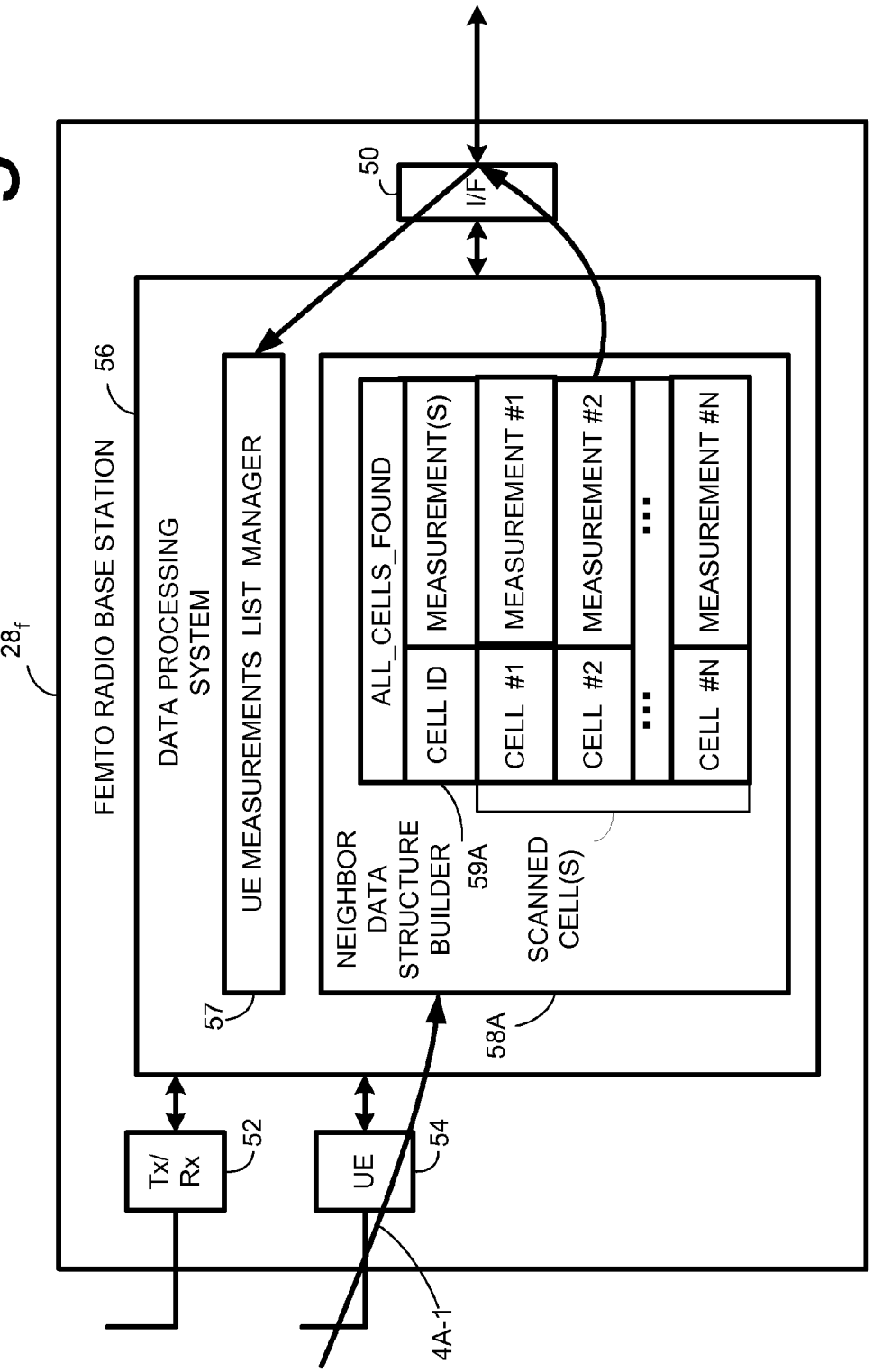

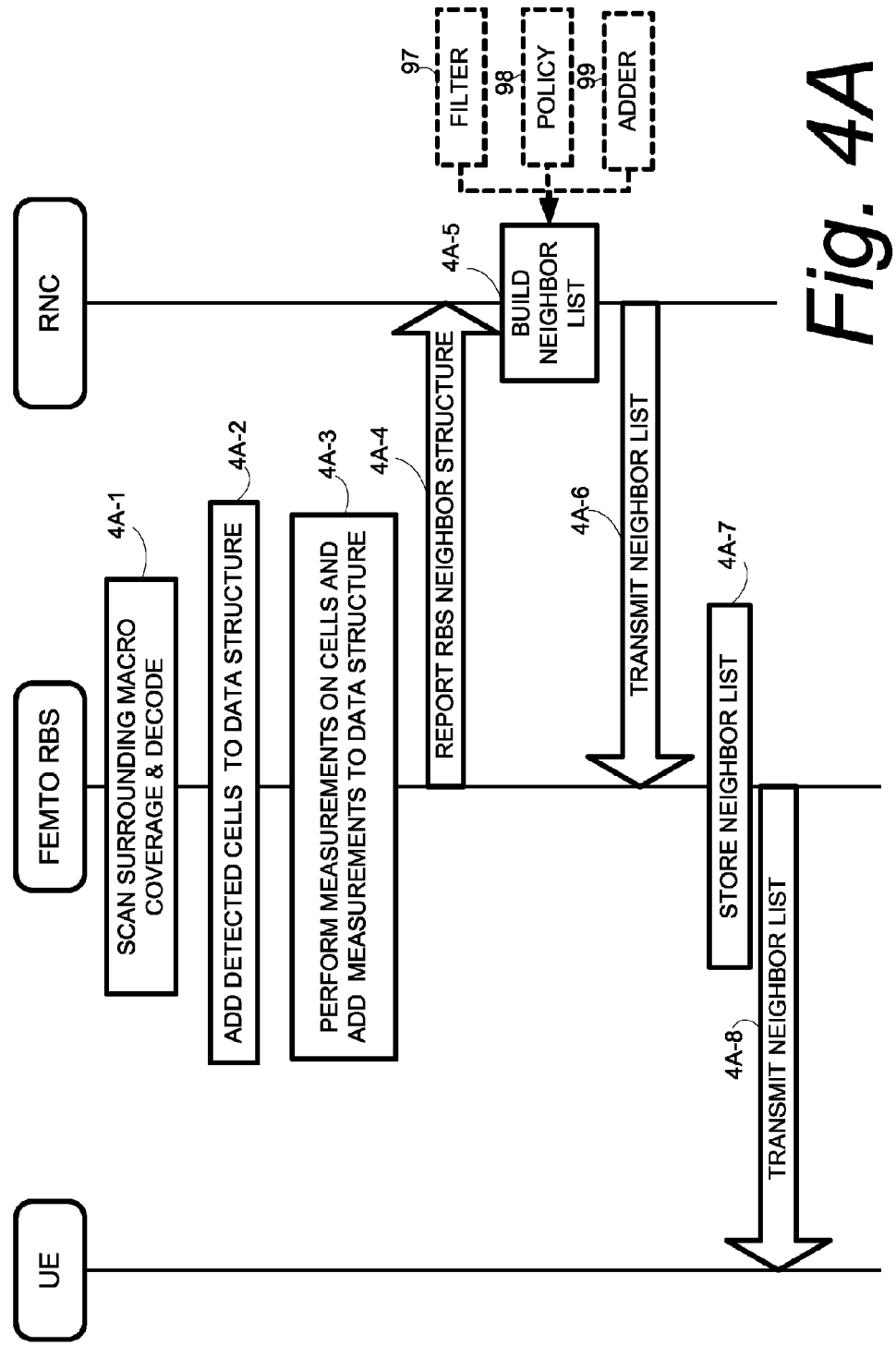

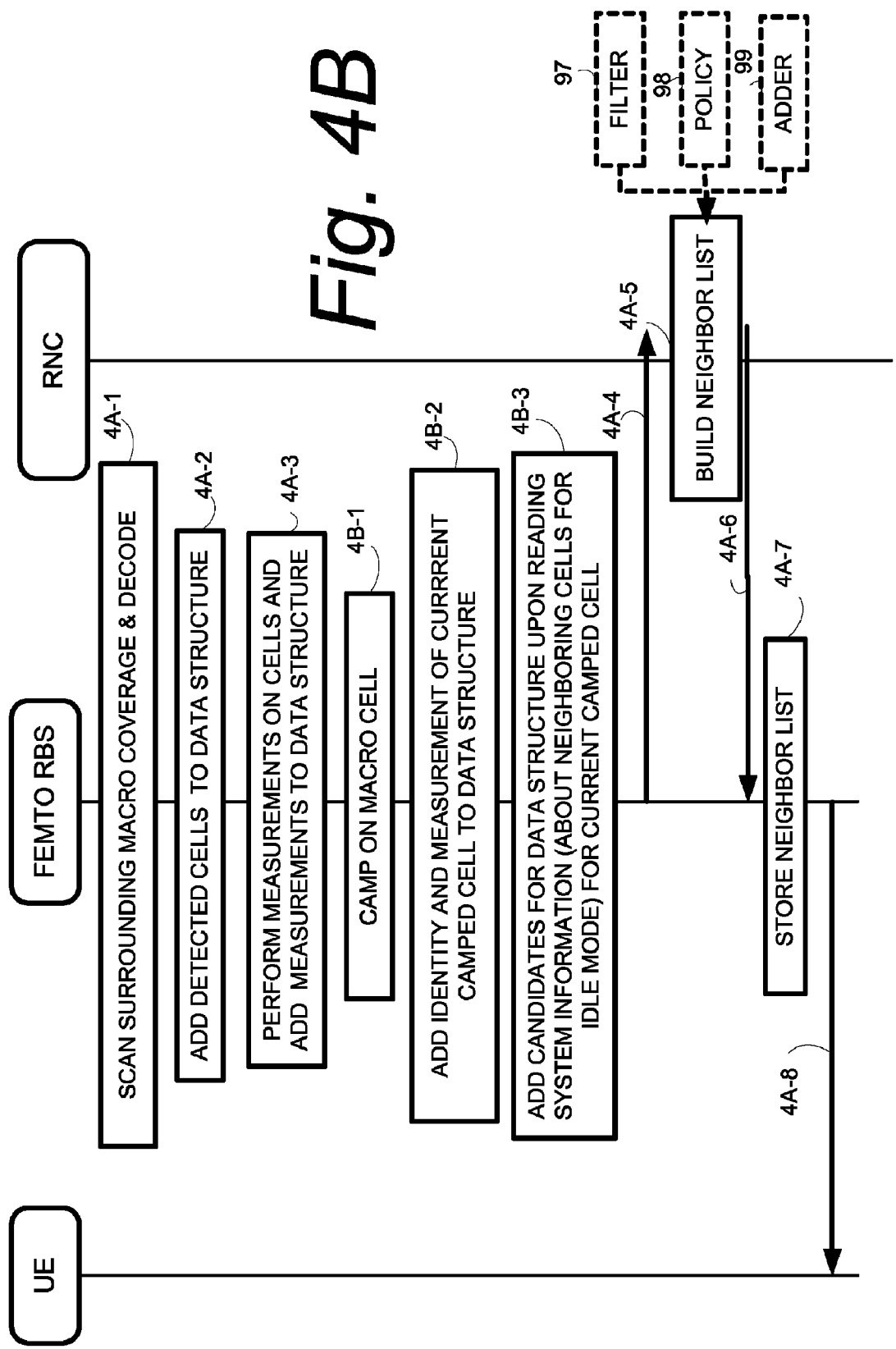

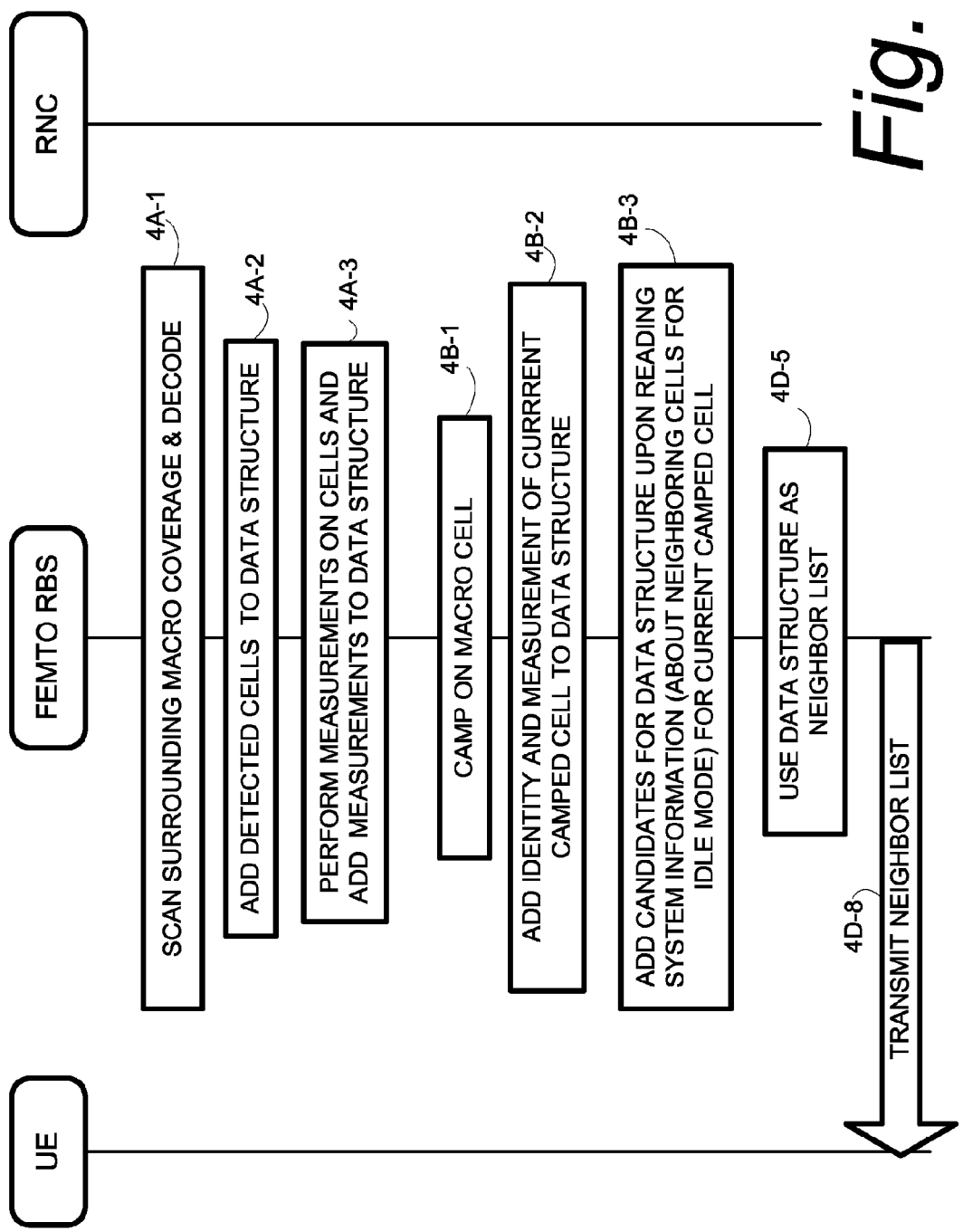

AUTOMATIC BUILDING OF NEIGHBOR LISTS IN MOBILE SYSTEM

CROSS REFERENCE TO RELATED APPLICATIONS

This application claims the benefit and priority of the following United State provisional patent applications (all of which are incorporated herein by reference in their entirety):

U.S. Provisional Patent Application 60/722,983, filed Oct. 4, 2005, entitled "REDIRECTION OF IP-CONNECTED RBS TO THE CORRECT RNC";

U.S. Provisional Patent Application 60/722,984, filed Oct. 4, 2005, entitled "AUTOMATIC RNC SELECTION FOR IP-CONNECTED RBS";

U.S. Provisional Patent Application 60/722,982, filed Oct. 4, 2005, entitled FINE-GRAINED ACCESS CONTROL IN A WCDMA SYSTEM USING PICO BASE STATIONS";

U.S. Provisional Patent Application 60/723,946, filed Oct. 6, 2005, entitled "PAGING FOR A WCDMA SYSTEM USING PICO BASE STATIONS";

U.S. Provisional Patent Application 60/728,780, filed Oct. 21, 2005, entitled "AUTOMATIC BUILDING OF NEIGHBOR LISTS IN A MOBILE SYSTEM"; and U.S. Provisional Patent Application 60/731,495, filed Oct. 31, 2005, entitled "AUTOMATIC CONFIGURATION OF THE MACRO RADIO IN A PICO BASE STATION".

This application is related to the following United States patent applications (all of which are incorporated herein by reference in their entirety):

U.S. patent application Ser. No. 11/538,088, filed on even date herewith, entitled "REDIRECTION OF IP-CONNECTED RADIO BASE STATION TO CORRECT CONTROL NODE";

U.S. patent application Ser. No. 11/538,081, filed on even date herewith, entitled "ACCESS CONTROL IN A RADIO ACCESS NETWORK HAVING PICO BASE STATIONS";

U.S. patent application Ser. No. 11/538,080, filed on even date herewith, entitled "PAGING FOR A RADIO ACCESS NETWORK HAVING PICO BASE STATIONS";

U.S. patent application Ser. No. 11/538,084, filed on even date herewith, entitled "RADIO NETWORK CONTROLLER SELECTION FOR IP-CONNECTED RADIO BASE STATION";

U.S. patent application Ser. No. 11/538,078, filed on even date herewith, entitled "AUTOMATIC CONFIGURATION OF MACRO RECEIVER OF PICO RADIO BASE STATION"; and, U.S. patent application Ser. No. 11/380,824, filed Apr. 28, 2006, entitled "DYNAMIC BUILDING OF MONITORED SET".

BACKGROUND

I. Technical Field

This invention pertains to wireless telecommunications, and particularly to operation of a "femto" or "pico" radio base station of a radio access network.

II. Related Art and Other Considerations

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast as system information in the cell. The base stations communicate over the air interface with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks. The core network has two service domains, with an RNC having an interface to both of these domains.

One example of a radio access network is the Universal Mobile Telecommunications System (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

As those skilled in the art appreciate, in WCDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handover of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

Other types of telecommunications systems which encompass radio access networks include the following: Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; and the code division multiple access (CDMA) system described in EIA/TIA IS-95.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a connection involves both a Source and Serving RNC (SRNC) and a target or drift RNC (DRNC), with the SRNC controlling the connection but with one or more diversity legs of the connection being handled by the DRNC. An Inter-RNC transport link can be utilized for the transport of control and data signals between Source RNC and a Drift or Target RNC, and can be either a direct link or a logical link. An interface between radio network controllers (e.g., between a Serving RNC [SRNC] and a Drift RNC [DRNC]) is termed the "Iur" interface.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations.

Some operators are investigating the possibility of providing home or small area WCDMA coverage for limited number of users using a small radio base station ("RBS"), also called a "Femto RBS" and/or a "Home RBS" and/or "pico RBS" and/or "micro RBS" in some contexts. According to such investigation, the small RBS would provide normal WCDMA coverage for the end users (e.g., to a user equipment unit (UE)), and would be connected to the RNC using some kind of IP based transmission. The coverage area so provided is called a "femto cell" (to indicate that the coverage area is relatively small). Other terminology for a femto cell includes "pico cell" or "micro cell", which is in contrast to a macro cell covered by a macro or standard radio base station (RBS).

One alternative for the IP based transmission is to use Fixed Broadband access (like xDSL, Cable etc.) to connect the home RBS to the RNC. Another alternative would be to use Wireless Broadband access (e.g. HSDPA and Enhanced Uplink; or WiMAX). FIG. 5 illustrates the two different backhaul alternatives in more detail. The first alternative is labeled "xDSL Backhaul" and the second alternative is labeled "WiMAX Backhaul".

In general, ordinary WCDMA base stations (macro RBS) are installed and configured by operator personnel, e.g., employees of an operator company which owns or maintains the macro RBS nodes and RNC nodes of the radio access network (RAN). As part of the installation, the macro RBS is manually configured with operational parameters, such as neighbor cell list information.

By contrast, a femto RBS is typically installed by the end user rather than the network operator. The end users are also able to move the Femto RBS geographically from place to place without the operator being able or willing to control relocation of the femto RBS. Such user-directed relocation requires that, operational parameters such as neighbor cell list information be handled automatically.

A neighbor cell list is a set of cells upon which a user equipment unit in idle mode should measure. The neighbor cell list (also known as "neighbor list") is typically included in a broadcast from the radio base station to idle mode user equipment units served by the radio base station. An active mode or connected mode user equipment unit is sent (over a dedicated signaling connection to the user equipment unit) a neighbor list in the form of a Monitored Set. The Monitored Set is a listing of neighbor cells to be used by the user equipment unit for measurements for a possible handover from the cell as commanded by a control node (e.g., radio network controller node). See, e.g., U.S. patent application Ser. No. 11/380,824, filed Apr. 28, 2006, entitled "DYNAMIC BUILDING OF MONITORED SET", incorporated herein by reference. In other words, a base station broadcasts information about neighbor cells that a user equipment unit (UE) in idle mode should measure on in order for the UE to determine which cell it should camp on. In the case of an active session, the list of cells of the Monitored Set is sent to the UE on a dedicated signalling connection (i.e. it is not broadcasted in this case), and guides the UE as to which cells to perform measurement reporting and to which cell a handover could occur as commanded by the RNC.

As used herein the terms "neighbor cell list" and "neighbor list" are used for both the broadcasted idle mode neighbour cell list and for the active/connected mode Neighbor cell list (i.e. the Monitored Set).

To create lists of such cells, considerable operational and management (O&M) efforts and support systems are needed. The lists should also be loaded into a network controller (at, e.g. an RNC node) and associated with the correct base station. This also increases the risk of human errors.

Since the handling of neighbor lists requires substantial work, in the case of pico (femto) base stations the work needed can increase quite substantially, especially since the femto base station can be moved to a new location by the end user, as described above. Conventionally there is no automated way, in either the Fixed Broadband Access alternative or in some variants of the Wireless Broadband alternative, for automatically building the neighboring cell lists.

What is needed, therefore, and an object herein provided, are new automatic mechanism(s) to build neighbor list(s) for the IP-connected Femto radio base station.

BRIEF SUMMARY

In a radio access network a femto radio base station comprises a resident receiver which acquires (over a radio interface) system information broadcast in a radio access network. At least part of the system information is used for building, at the femto radio base station, a neighbor data structure comprising information for neighboring cells. The neighbor data structure is then used for building a neighbor list. The neighbor list is subsequently transmitted from the femto radio base station to a user equipment unit served by the femto radio base station.

In some example embodiments and modes, the femto radio base station reports the neighbor data structure to a network node. The other node uses the neighbor data structure for building the neighbor list. The other node can be, for example, a radio network controller node or a backend system node connected to the radio network controller node. The neighbor list as build by the other node is transmitted to the femto radio base station, so that the femto radio base station can, in turn, subsequently transmit the neighbor list from the femto radio base station to a user equipment unit served by the femto radio base station in the sense, e.g., that the neighbor list is broadcast to idle mode user equipment units served by the femto radio base station or sent over a dedicated signaling connection to a specific user equipment unit in connected mode or active mode.

In some example embodiments and modes, acquisition of the system information comprises scanning a surrounding macro coverage area of the femto radio base station for obtaining cell identity information for detected cells. For each detected cell, the cell identity information is added to the neighbor data structure. Further, the resident receiver of the femto radio base station performs measurement of signal strength for each cell having its cell identity added to the neighbor data structure. A measured value of the signal strength for each such cell is added to the neighbor data structure.

In other example embodiments and modes, the acquisition of the system information additionally comprise at least temporarily camping on macro cell found during the scanning of the macro coverage. Cell identity information and a signal strength measurement for the camped-on macro cell are added to the neighbor data structure. In addition, at least one system information block in the camped-on macro cell is consulted/used for obtaining information about at least one neighboring cell. The cell identity information and signal strength measurement for the neighboring cell are also added to the neighbor data structure. By obtaining cell identities and signal strength measurements of neighboring cells for idle mode from system information blocks of the camped-on macro cell, candidates for the neighbor data structure can be selected without having to scan the entire spectrum for possible cells. Moreover, if desired, the neighbor data structure as built by the femto radio base station can be used as the neighbor list for transmission to the user equipment unit served by the femto radio base station.

In some embodiments and modes, using the neighbor data structure for building the neighbor list comprises at least one of the following: (1) filtering at least one cell from the neighbor data structure; (2) replacing at least one cell of the neighbor data structure with a replacement cell; and (3) adding a new cell to the neighbor data structure. The modifications of filtering, replacing, and/or adding cells can be in accordance with internal policies.

In one of its aspects, the technology concerns a femto radio base station comprising a resident radio receiver arranged for scanning a surrounding macro coverage area of the femto radio base station for obtaining system information comprising cell identity information for detected cells and for performing signal strength measurements. The femto radio base station also comprises a neighbor data structure builder arranged for using at least part of the system information for building a neighbor data structure comprising information for neighboring cells, the neighbor data structure builder being arranged to include in the neighbor data structure the cell identity information for detected cells and the signal strength measurement for each cell in the neighbor data structure.

In one of its aspects, the technology concerns a femto radio base station arranged with its resident radio receiver not only serving for scanning a surrounding macro coverage area of the femto radio base station for obtaining system information, but also for at least temporarily camping on a macro cell found during the scanning. As a result of at least temporarily camping on the macro cell, the femto radio base station is also arranged for obtaining: (1) cell identity and a signal strength measurement for the camped-on macro cell; and (2) system information block in the camped-on macro cell for obtaining information about at least one neighboring cell. The femto radio base station further comprises a neighbor data structure builder arranged for using (1) and (2) for building a neighbor data structure. Optionally, the femto radio base station also may comprise a list manager arranged for using the neighbor data structure as built by the neighbor data structure builder of the femto radio base station as the neighbor list for transmission to a user equipment unit served by the femto radio base station.

In yet another of its aspects, the present technology concerns a radio access network (RAN) comprising both a femto radio base station and another node. The femto radio base station comprises a resident radio receiver arranged for obtaining system information broadcast in a radio access network and means for using at least part of the system information for building, at the femto radio base station, a neighbor data structure comprising information for neighboring cells. The other node is arranged for using the neighbor data structure for building the neighbor list. The other node can be, for example, a radio network controller node or a backend system connected to the radio network controller node.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1A is a diagrammatic view of an example embodiment of a telecommunications system including a radio access network wherein a selected femto radio base station is connected to the radio access network (RAN) by generic access transmission.

FIG. 1B is a diagrammatic view of an example embodiment of a telecommunications system including a radio access network wherein a selected femto radio base station is connected to the radio access network (RAN) by mobile broadband access transmission.

FIG. 2A is a schematic view of an example embodiment of a femto radio base station using generic broadband access transmission.

FIG. 4A is a diagrammatic view of example steps and actions performed in a first example mode of operation.

FIG. 4B is a diagrammatic view of example steps and actions performed in a second example mode of operation.

FIG. 4D is a diagrammatic view of example steps and actions performed in a fourth example mode of operation.

DETAILED DESCRIPTION

Figure 2B:
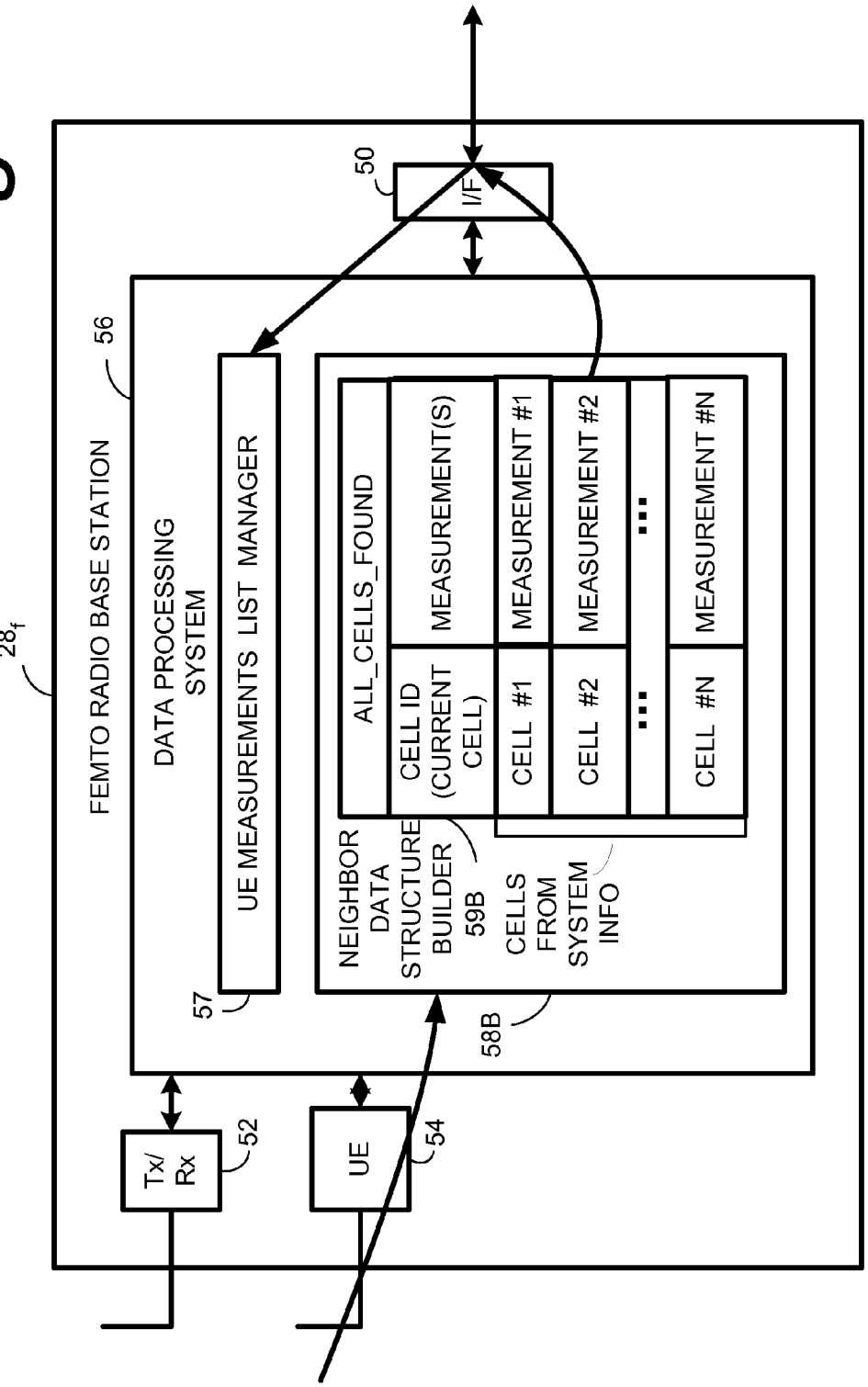
FIG. 2B is a schematic view of an example embodiment of a femto radio base station using wireless broadband access transmission.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

The present invention is described in the non-limiting, example context of a telecommunications system 10 shown in FIG. 1A. The telecommunications system 10 connects to a core network 20. The telecommunications system 10 comprises a radio access network 24. The radio access network 24 includes one or more radio network controller nodes (RNCs) 26 and one or more radio base stations (BS) 28. For sake of example FIG. 1A particular shows two radio network control nodes, i.e., a first radio network control $26_1$ and a second radio network control $26_2$ as well as both a macro radio base station (only one macro radio base station $28_M$ being shown in FIG. 1A) and plural femto radio base stations $28_{f1}, 28_{f2}, \ldots 28_{fx}$. The macro radio base station $28_M$ serves a macrocell CM. The femto radio base stations $28_{f1}, 28_{f2}, \ldots 28_{fx}$ serve respective femtocells $C_{f1}, C_{f2}, \ldots C_{fx}$. The person skilled in the art understands that a radio base station is typically situated at an interior (e.g., center) of the respective cell which the radio base station serves, but for sake of clarity the macro radio base station and femto radio base stations of FIG. 1A are shown instead as being associated by double headed arrows to their respective cells. At least some of the femtocells $C_{f1}, C_{f2}, \ldots C_{fx}$ are geographically overlayed or overlapped by the macrocell $C_M$.

As used herein, a "femto radio base station" also has the meaning of a pico radio base station or a micro radio base station, which serves a femto cell (or pico cell or micro cell). The femto cell is typically overlaid by one or more macro cells and serves a smaller geographic area or subscriber constituency than a macro cell. The technology described herein has particular benefit for a femto radio base station which can be installed and/or relocated within a radio access network without the installation or relocation being controlled by the owner/operator of the radio access network. In other words, a non-network operator entity (a femto operator) can acquire the femto radio base station and situate the femto radio base station in accordance with the preferences of the femto operator. In this regard, FIG. 1A happens to show such a femto radio base station $28_{fj}$ which may have recently been moved or activated by a femto operator. The femto radio base station $28_{fj}$ has its femto cell $C_{fj}$ situated or located geographically so as to be overlaid by macrocell $C_M$.

A user equipment unit (UE), such as user equipment unit (UE) 30 shown in FIG. 1A, communicates with one or more cells or one or more base stations (BS) 28 over a radio or air interface 32. The user equipment unit can be a mobile station such as a mobile telephone ("cellular" telephone) and laptop with mobile termination, and thus can be, for example, portable, pocket, hand-held, computer-included, or car-mounted mobile device which communicate voice and/or data with radio access network.

The radio access network 24 shown in FIG. 1A can be, by way of non-limiting example, a UMTS Terrestrial Radio Access Network (UTRAN). In the UTRAN, radio access is preferably based upon Wideband Code Division Multiple Access (WCDMA) with individual radio channels allocated using CDMA spreading codes. Of course, other access methods may be employed. The nodes 26 and 28 are respectively termed the radio network control node and the radio base station nodes in view of the UTRAN example. However, it should be understood that the term radio network control and radio base station also encompasses nodes having similar functionality for other types of radio access networks. Other types of telecommunications systems which encompass other types of radio access networks include the following: Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; and the code division multiple access (CDMA) system described in EIA/TIA IS-95.

The radio access network 24 is connected to core network 20 over an interface, such as the Iu interface for UTRAN. The core network 20 of FIG. 1A can comprise, among other things a Mobile Switching Center (MSC) node, a Gateway MSC node (GMSC), a Gateway General Packet Radio Service (GPRS) support node (GGSN), and a Serving GPRS Support node (SGSN). Circuit switched (CS) network or packet switched (PS) network can be connected to core network 20.

For sake of simplicity, the radio access network 24 of FIG. 1A is shown with only two RNC nodes 26. Multiple radio network controller nodes (RNCs) may be provided, with each RNC 26 being connected to one or more base stations (BS) 28. It will be appreciated that a different number of base stations than that shown in FIG. 1A can be served by a radio network control 26, and that RNCs need not serve the same number of base stations. Moreover, an RNC can be connected over an Iur interface to one or more other RNCs in radio access network 24. The radio network controller node (RNC) 26 communicates over an interface Iub with the macro radio base station $28_M$. Further, those skilled in the art will also appreciate that a base station such as the macro radio base station 28 is sometimes also referred to in the art as a radio base station, a node B, or B-node. Each of the radio interface 32, the Iu interface, the Iur interface, and the Iub interface are shown by dash-dotted lines in FIG. 1A.

FIG. 1A can be viewed as illustrating generic access of femto radio base station $28_{fj}$ to the radio access network (RAN), e.g., to its radio network controller node (e.g., radio network controller node $26_1$ in the specifically illustrated scenario). By "generic access" is meant that the access afforded to femto radio base station $28_{fj}$ can be either broadband fixed access or broadband mobile access (e.g., WiMAX) as described above. To this end, in FIG. 1A the femto radio base stations $28_f$ including femto radio base stations $28_{fj}$ are connected to a communications network 38. An example of such communications network is an IP network 38.

By contrast, FIG. 1B illustrates a scenario of broadband wireless or mobile access for femto radio base station $28_{fj}$. As such, FIG. 1B illustrates that access for femto radio base station $28_{fj}$ to the radio access network 24 is through a macro radio base station (e.g., macro RBS $28_M$ in the illustrated scenario). As explained previously, wireless or mobile broadband access can occur using, e.g. High Speed Downlink Packet Access (HSDPA) and Enhanced Uplink; or WiMAX. Unless otherwise specifically exempted in its context, aspects of the technology described herein are applicable to all types of access, including broadband fixed access and broadband mobile access (e.g., broadband wireless access).

FIG. 2A illustrates basic, selected, representative constituent elements of an first example generic femto radio base station $28_f$. One or more of the femto radio base stations $28_{f1}$, $28_{f2}$, ... $28_{fx}$ can take the form of the generic femto radio base station $28_f$ shown of FIG. 2. The femto radio base station $28_f$ of FIG. 2 is shown as including, among its other unillustrated constituent units, an IP interface unit 50; one or more radio frequency transceivers 52, a radio frequency receiver 54; and, a data processing system, section, or unit 56. FIG. 2A shows the data processing system 56 as comprising a controller or processor which includes UE measurements list manager 57 and neighbor data structure builder 58A. The neighbor data structure builder 58A is arranged and configured for building a neighbor data structure 59A such as that entitled "All_Cells_Found" in the depiction of FIG. 2A. It will be appreciated that UE measurements list manager 57 and neighbor data structure builder 58A can take other forms, e.g., such as one or more independent processor(s) or controller(s).

Figure 2C:
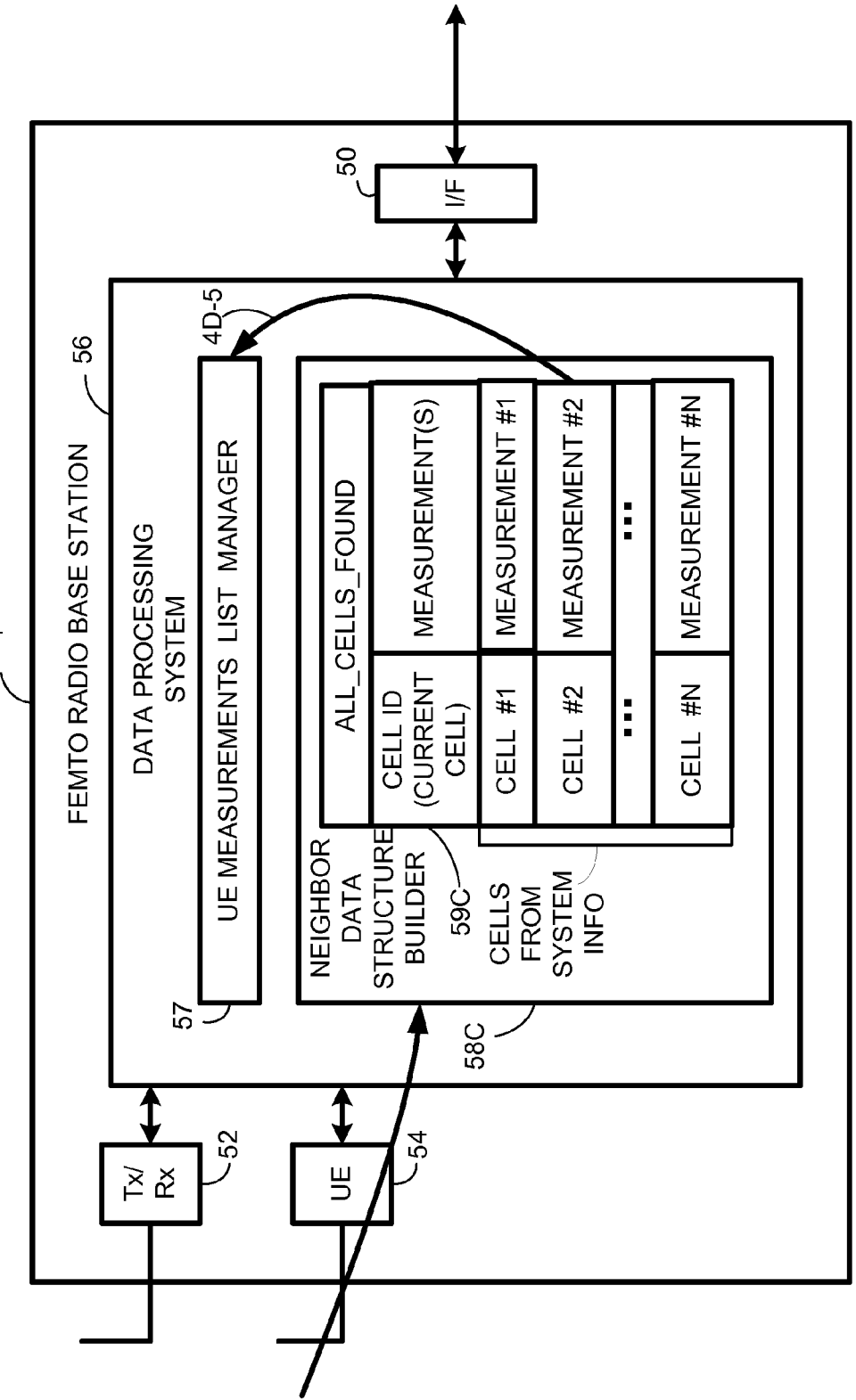
FIG. 2C is a schematic view of an example embodiment of a femto radio base station using wireless broadband access transmission and which, on its own accord, uses a neighbor data structure developed by the femto radio base station as the neighbor list.

FIG. 2B illustrates basic, selected, representative constituent elements of another example femto radio base station $28_f$. Many of the elements of the femto radio base station $28_f$ of FIG. 2B are identical or at least similar to those of the femto radio base station $28_f$ of FIG. 2A, as indicated by corresponding reference numerals. In view of the fact that the neighbor data structure builder of femto radio base station $28_f$ of FIG. 2B is arranged for building its neighbor data structure in somewhat different manner, the neighbor data structure builder and neighbor data structure are depicted as neighbor data structure builder 58B and neighbor data structure 59B, respectively.

For both the femto radio base station $28_f$ of FIG. 2A and the femto radio base station $28_f$ of FIG. 2B, the radio frequency transceivers 52 are for communicating over the radio or air interface with user equipment units (UEs) in the femto cell served by the femto radio base station $28_f$. The number of radio frequency transceivers 52 depends on various factors including capacity of the femto radio base station to handle mobile connections.

Receiver 54 is resident at femto radio base station $28_f$ and serves for acquiring, at femto radio base station $28_f$ and over radio interface 32, system information broadcast in the radio access network 24. When the radio access network (RAN) is a WCDMA network, for both the embodiment of FIG. 2A and the embodiment of FIG. 2B the receiver 54 is a WCDMA receiver. In this sense, in both embodiments the receiver 54 can take the form of a user equipment unit (UE). That is, in the femto radio base station $28_f$ of FIG. 2A, the receiver 54 can be a femto RBS-based user equipment unit (UE) which is capable of scanning the surrounding macro coverage.

Figure 3A:
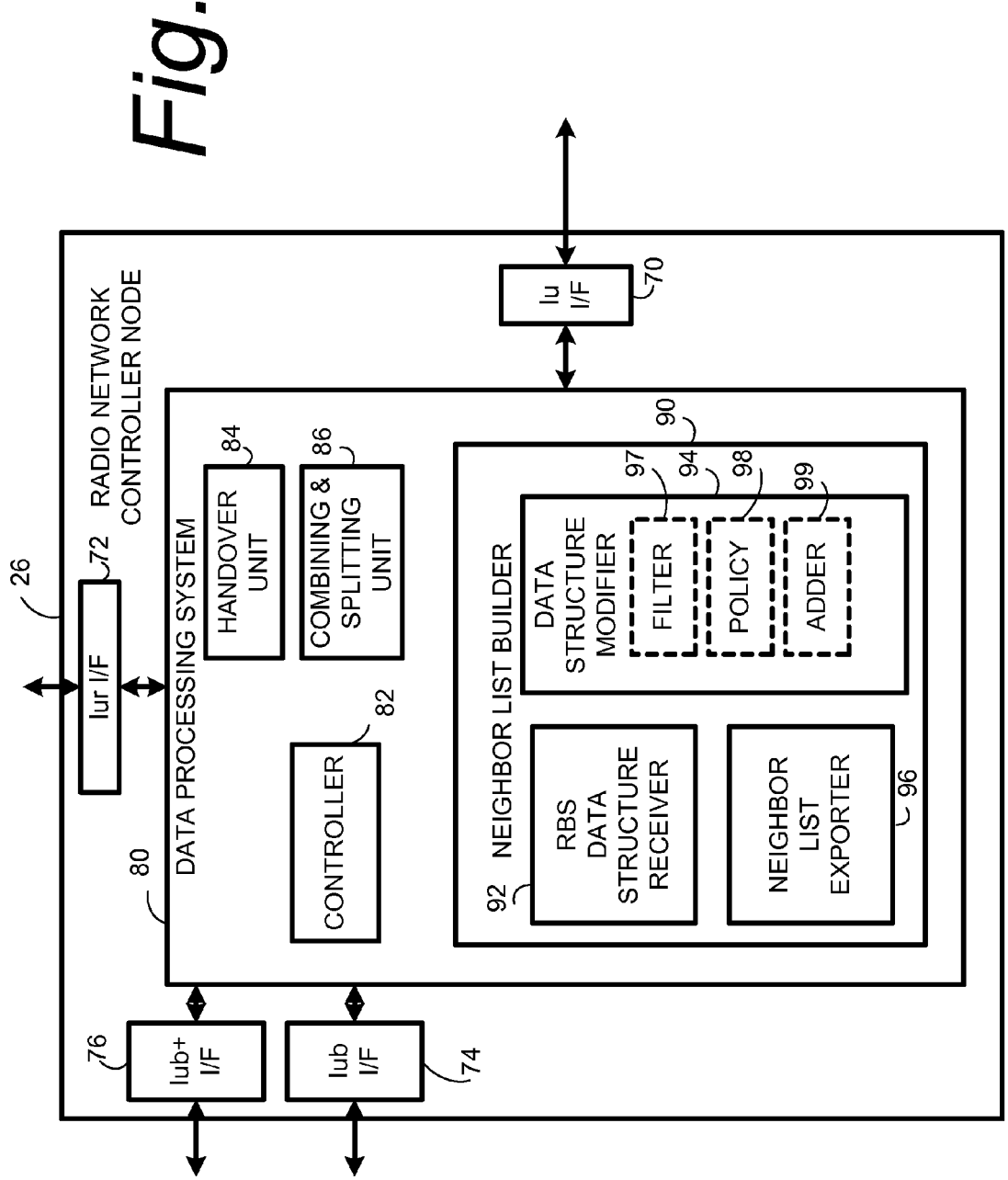
FIG. 3A is a schematic view of a first example embodiment radio network controller (RNC) node.

FIG. 3A illustrates basic, selected, representative constituent elements of a first example radio network control node 26. The radio network control node 26 can comprise several interface units, such as an interface unit 70 for connecting radio network control node 26 over the Iu interface to core network 20; an interface unit 72 for connecting radio network control node 26 over the Iur interface to other radio network controllers; one or more interface units 74 for connecting radio network control node 26 over the Iub interface to respective one or more macro radio base stations $28_M$; and, one or more interface units 76 for connecting radio network control node 26 to respective one or more femto radio base stations $28_{f1}$, $28_{f2}$, ... $28_{fx}$. The connection between RNC 26 and the femto radio base stations $28_m$ can occur over communications network 38 and can utilize, e.g., Internet Protocol (IP)-based transmission. The connection between RNC 26 and the macro radio base station(s) $28_M$ can utilize, e.g., Internet Protocol (IP)-based and/or ATM-based transmission.

In addition to interface units, the radio network control node 26 comprises numerous unillustrated constituent units, as well as a data processing system, section, or unit 80. As shown in FIG. 3, in an example, non-limiting implementation the data processing system 80 of radio network control node 26 comprises a control section (e.g., controller 82); a handover unit 84; a combiner and splitter unit 86 (involved, e.g., in handling diversity legs of a connection); and, neighbor list builder 90.

The neighbor list builder 90 is arranged and configured for receiving the neighbor data structure from femto radio base station $28_f$ and for building a neighbor list. Example functionalities depicted by separate functional units comprising neighbor list builder 90 include RBS data structure receiver 92; data structure modifier 94; and neighbor list exporter 96. The data structure modifier 94 is shown as optionally including various further functionalities or units, such as filter unit 97; policy unit 98; and adder unit 99. It will be appreciated that neighbor list builder 90 and any of the illustrated functional units thereof can take other forms, e.g., such as one or more independent processor(s) or controller(s), for example.

Figure 3B:
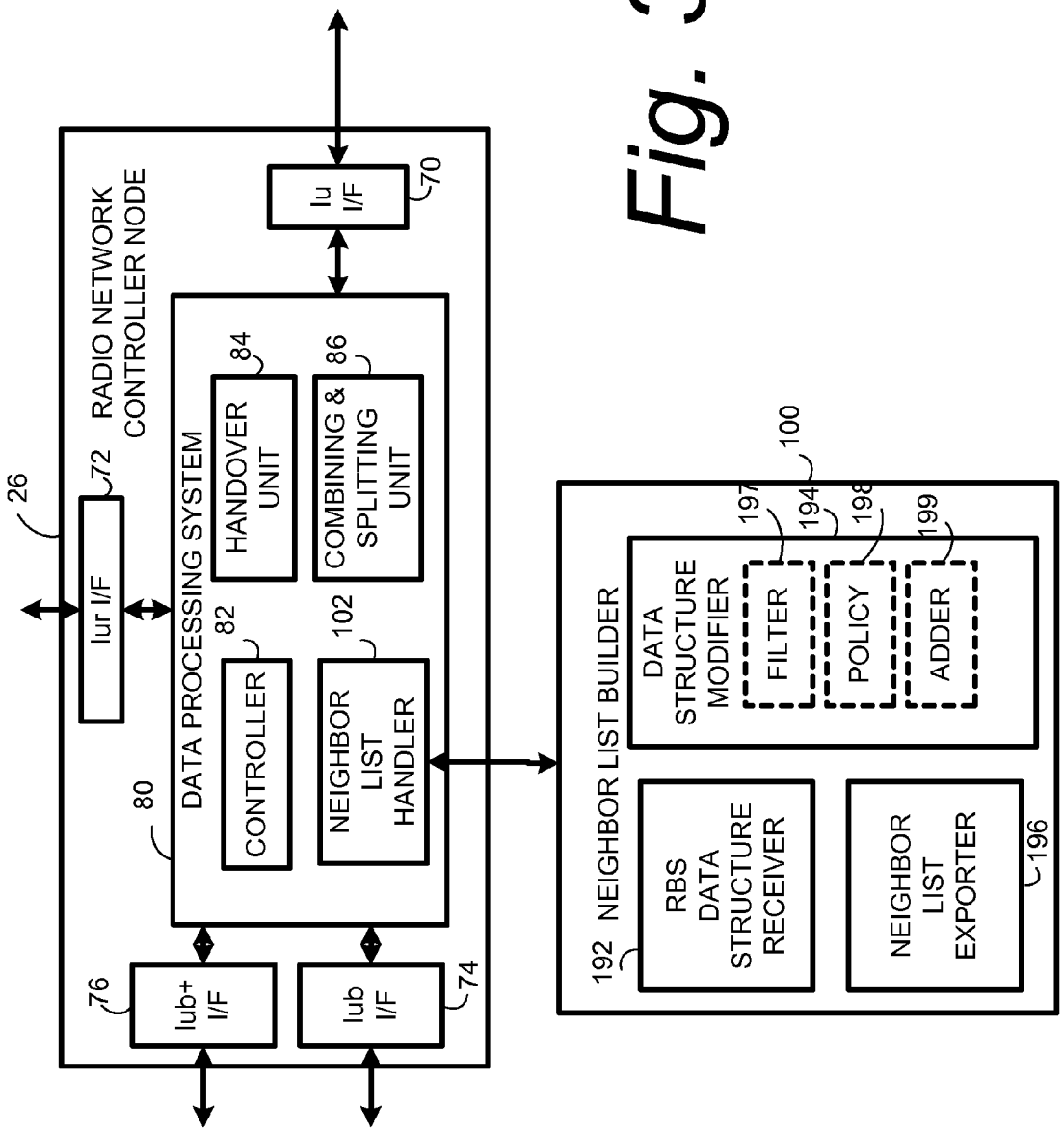
FIG. 3B is a schematic view of a second example embodiment radio network controller (RNC) node.

FIG. 3B illustrates another example radio network control node 26. Many of the elements of the radio network controller node 26 of FIG. 3B are identical or at least similar to those of the radio network controller node 26 of FIG. 3A, as indicated by corresponding reference numerals. However, the radio network controller node 26 of FIG. 3B differs in, e.g., the fact that the neighbor list builder functionality is distributed instead to a backend system connected to the radio network controller node 26 of FIG. 3B, as illustrated by neighbor list builder node 100 of FIG. 3B. The radio network controller node 26 of FIG. 3B includes a neighbor list handler 102 which interfaces with neighbor list builder node 100 and manages transmission of the neighbor list built by neighbor list builder node 100 to the femto radio base station. In like manner as neighbor list builder 90, example functionalities depicted by separate functional units comprising neighbor list builder node 100 include RBS data structure receiver 192; data structure modifier 194; and neighbor list exporter 196, with data structure modifier 194 optionally including various further functionalities or units, such as filter unit 197; policy unit 198; and adder unit 199. It will again be appreciated that neighbor list builder node 100 and any of the illustrated functional units thereof can take other forms, e.g., such as one or more independent processor(s) or controller(s), for example.

FIG. 4A shows example steps and actions performed in a first example mode of operation. The first example mode of operation is generic access type, and thus can encompass steps and actions performed for either or both of fixed broadband access and wireless broadband access. The example steps and actions of FIG. 4A and other comparable figures can occur, for example, at a time at which the femto radio base station $28_{fj}$ has just been activated by a femto operator.

Step 4A-1 of FIG. 4A shows resident receiver 54 acquiring (over radio interface 32) system information broadcast in radio access network 24. In particular, step 4A-1 depicts the receiver 54 of femto radio base station $28_f$ scanning a surrounding macro coverage area of the femto radio base station for obtaining cell identity information for detected cells. In one example WCDMA implementation, the receiver 54 reads the relevant scrambling codes and decodes the Master Information Block (MIB) to find the PLMN-ID; reads and decodes System Information Block 1 (SIB1) to find the LAC; and reads and decodes System Information Block 3 (SIB3) to find the Cell Identity system information. As step 4A-2, the neighbor data structure builder 58 adds the detected cells (using cell identifiers) to neighbor data structure 59. For each detected cell, the cell identity information is added to neighbor data structure 59.

As step 4A-3, resident receiver 54 of the femto radio base station $28_f$ performs measurement of signal strength for each cell having its cell identity added to the neighbor data structure 59. As part of step 4A-3, a measured value of the signal strength for each such cell is added to the neighbor data structure. In other words, the receiver 54 also performs the measurement of the signal strength in each cell listed in the neighbor data structure 59 (All_Cells_Found). After completion of neighbor data structure 59, femto radio base station $28_f$ reports these results (in the form of neighbor data structure 59) to its radio network controller node 26, preferably using the IP-based connection afforded by IP network 38. FIG. 4A shows the reporting of the neighbor data structure 59 to radio network controller node 26 as step 4A-4.

Upon receipt of the neighbor data structure 59, the radio network controller node 26 suitably invokes neighbor list builder 90. Building of the neighbor list is generally depicted as step 4A-5 in FIG. 4A. The RBS data structure receiver 92 of neighbor list builder 90 receives and analyzes the neighbor data structure 59 as essentially received from the femto radio base station $28_f$. The neighbor list builder 90 builds the neighbor list, also known as Femto_RBS_SI_Neigboring_List. In so doing, neighbor list builder 90 can invoke data structure modifier 94. For example, filter unit 97 of data structure modifier 94 can optionally or selectively apply filtering to the All_Cells_Found information (e.g., neighbor data structure 59) received from the Femto RBS based on some internal policies so that some cells are not included in the Femto_RBS_SI_Neigboring_List. Some cells could also be replaced by other cells upon invocation of policy unit 98 based on internal policies when the Femto_RBS_SI_Neigboring_List is built. As a third option, totally new cells could be included in the Femto_RBS_SI_Neigboring_List (e.g., added by adder unit 99) based on internal policies and All_Cells_Found information.

These policies implemented by data structure modifier 94 can be configured by the network operator either in the RBS or in the RNC, e.g., in the node that builds the neighboring cell lists depending on embodiment. These policies could also be defined in a central network node (e.g. RNC or O&M node) and then downloaded to the RBS which applies the policies. One example policy would be to not include cells that have their measured signal strength below a certain threshold. Another policy would be to, e.g., black-list cells depending on which PLMN these belong to (as indicated by the PLMN-ID).

Still another policy would be to never include certain cells that the network operator has configured in a "black list". Still another policy would be to have a mapping table, e.g., if macro cell-X (e.g. a UMTS cell) is reported, then it will be always replaced with macro cell-Z (e.g. a GSM cell).

After building of the neighbor list at step 4A-5 is completed, neighbor list exporter 96 formats and/or prepares the neighbor list for transmission to femto radio base station $28_f$. Step 4A-6 of FIG. 4a shows the neighbor list being transmitted from the radio network controller node 26 to femto radio base station $28_f$. Step 4A-7 shows the neighbor list received from radio network controller node $26_1$, being stored in UE measurements list manager 57. Step 4A-8 shows subsequently transmission of the neighbor list from femto radio base station $28_f$ to a user equipment unit 30 served by the femto radio base station. As one implementation of step 4A-8 the neighbor list is broadcasted to all user equipment units in idle mode served by femto radio base station $28_f$. As another implementation of step 4A-8 the neighbor list is sent in the form of the Monitored Set over a dedicated signaling connection to a specific user equipment unit in connected mode or active mode.

As an aside, UE measurements list manager 57 can be used for storing and managing notification of lists other than the neighbor list, including the monitored set, for example.

For the example embodiment of femto radio base station shown in FIG. 2A, the neighbor data structure 59A built by neighbor data structure builder 58A is shown as including a list of "scanned cells", since the receiver 54 of the femto radio base station $28_f$ of FIG. 2A scanned the surrounding coverage area.

FIG. 4B shows example steps and actions performed in a second example mode of operation. In the mode of operation depicted in FIG. 4B, the series of steps comprising step 4A-1 through step 4A-3 of the mode of FIG. 4A are augmented by the series of steps comprising step 4B-1 through step 4B-3.

Step 4B-1 of FIG. 4B shows resident receiver 54 at least temporarily camping on a macro cell found during the scanning of step 4A-1 and acquiring (over radio interface 32) system information broadcast in radio access network 24. As step 4B-2, cell identity information and a signal strength measurement for the camped-on macro cell are added to neighbor data structure 59B if not already included in neighbor data structure 59B. In addition, as step 4B-3, at least one system information block in the camped-on macro cell is consulted/used for obtaining information about at least one neighboring cell. The cell identity information and signal strength measurement for the at least one neighboring cell are also added to the neighbor data structure as part of step 4B-3.

Explaining the foregoing in more detail, when the receiver 54 (UE) in femto radio base station $28_f$ has successfully camped on the macro cell, it also includes measurements and identity of the current camped cell in neighbor data structure 59B (as step 4B-2) if such are not already present in neighbor data structure 59B. The receiver 54 (UE) can also read and decode the System Information Block 11 (SIB11) in the current cell. SIB11 contains information about the neighboring cells for idle mode and can be also used to select the candidates for the All_Cells_Found instead of scanning the whole spectrum for possible cells.

Step 4A through step 4A-8 of the example mode of FIG. 4B are essentially the same or similar to corresponding step 4A-4 through step 4A-8 of the mode of FIG. 4A. These steps including reporting of the neighbor data structure 59B to radio network controller node 26 as step 4A-4; building of the neighbor list as is generally depicted by step 4A-5; transmission of the neighbor list from the radio network controller node 26 to femto radio base station 28$_f$ as step 4A-6; storage of the neighbor list received from radio network controller node 26$_1$ in UE measurements list manger 57 as step 4A-7; and subsequently transmission of the neighbor list from femto radio base station 28$_f$ to a user equipment unit 30 served by the femto radio base station as step 4A-8.

For the example embodiment of femto radio base station shown in FIG. 2B, the neighbor data structure 59B built by neighbor data structure builder 58B is shown as including, along with an identifier for the camped-on cell, a list of "cells from system information", since the receiver 54 of the femto radio base station 28$_f$ of FIG. 2B obtained such system information from system information block(s) for the camped-on cell(s). The neighbor data structure built by the mode of FIG. 4B thus is a concatenation of entries such as that shown in the neighbor data structure 59A and entries such as that shown in neighbor data structure 59B in FIG. 2B.

By obtaining cell identities of neighboring cells for idle mode from system information blocks of the camped-on macro cell in the manner of the mode of FIG. 4B, candidates for the neighbor data structure can be selected without having to scan the entire spectrum for possible cells. Signal strength measurements are then performed for these cells as a separate step.

In some example embodiments and modes such as those described hereinbefore, the femto radio base station reports the neighbor data structure to a network node other than the femto radio base station. The other node uses the neighbor data structure for building the neighbor list at the other node. In the already-illustrated embodiments, the other node is a radio network controller node.

Figure 4C:
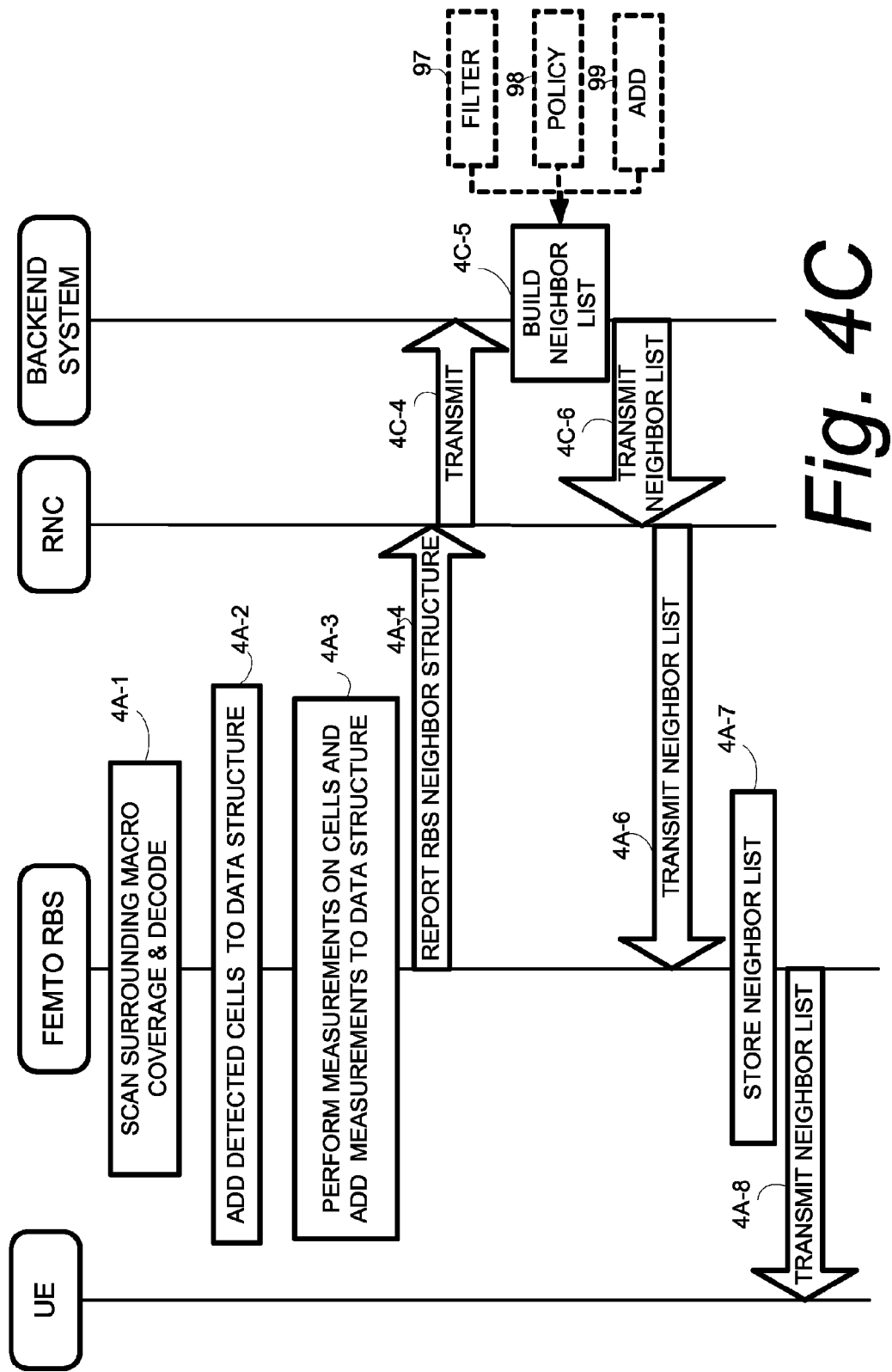
FIG. 4C is a diagrammatic view of example steps and actions performed in a third example mode of operation.
Figure 5:
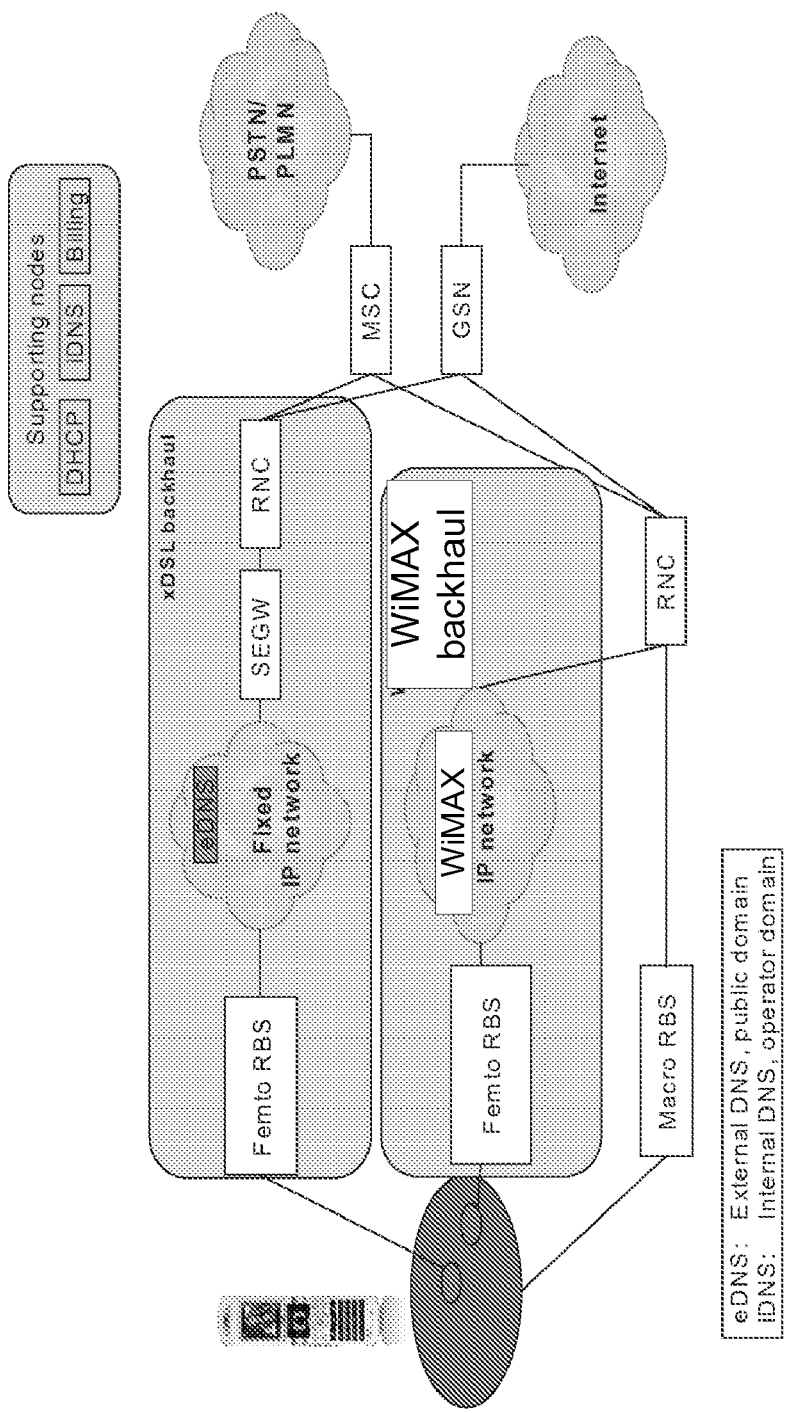
FIG. 5 is a diagrammatic view showing two different backhaul alternatives.

FIG. 4C shows example steps and actions performed in a third example mode of operation. In the mode of FIG. 4C, the other node which uses the neighbor data structure for building the neighbor list is not the radio network controller node 26$_1$, but a neighbor list builder node 100 such as that illustrated in FIG. 3B. The neighbor list builder node 100 can be, for example, a backend system node connected to the radio network controller node. The preliminary steps of FIG. 4C can be the first four steps of the mode of FIG. 4A or the first seven steps of the mode of FIG. 4B. For sake of simplification, FIG. 4C shows its first steps as being the first three steps of the mode of FIG. 4A, e.g., step 4A-1 through step 4A-4. As step 4A-4, the neighbor data structure 59 is received by radio network controller node 26. However, as step 4C-4 the radio network controller (RNC) delegates or transmits the neighbor data structure 59 to its neighbor list builder node 100. The neighbor list builder node 100 uses the neighbor data structure 59 to build the neighbor list, as depicted by step 4C-5 of FIG. 4C. Upon completion of the neighbor list, the neighbor list builder node 100 returns the completed neighbor list to radio network controller node 26 as step 4C-6, whereupon the radio network controller node 26 conveys the completed neighbor list to femto radio base station 28$_f$ as step 4A-6. Storage of the neighbor list received from radio network controller node 26$_1$, in UE measurements list manger 57 occurs as step 4A-7; and subsequently transmission of the neighbor list from femto radio base station 28$_f$ to a user equipment unit 30 served by the femto radio base station occurs as step 4A-8.

In the embodiments and modes of FIG. 4A-FIG. 4C discussed above, the neighbor data structure 59 or some variation or modification thereof is sent from the femto radio base station to another node so that the other node can build the neighbor list. The other node then returns the neighbor list to the femto radio base station. An interface and suitable protocol is arranged for transmission of the neighbor data structure and the neighbor list are transmitted between the femto radio base station and at least one other node. In some embodiments, the neighbor data structure and the neighbor list are sent over an extended Iub interface (e.g., an "Iub+" interface). The Iub+ interface resembles the conventional Iub interface existing between radio base station nodes and radio network controller nodes, but the protocol therefore is augmented or modified to include information elements or other aspects necessary for implementing transmission of the neighbor data structure and neighbor list. Alternatively, rather than using an extension of the Iub interface and protocol, an entirely new interface and protocol can be utilized which is tailored or otherwise arranged for facilitating transmission of the neighbor data structure and neighbor list between the femto radio base station and other network nodes or entities.

In accordance with at least one embodiment and mode of the technology, the neighbor list need not necessarily be built by a node other than the femto radio base station. In this regard, FIG. 4D shows example steps and actions performed in a fourth example mode of operation. The mode of FIG. 4D is also illustrated by the femto radio base station 28$_f$ of FIG. 2C.

The first six steps of the mode of FIG. 4D are the same as those of the mode of FIG. 4B: step 4A-1 through step 4A-3 and step 4B-1 through step 4B-3. However, rather than sending the neighbor data structure 59B built by the femto radio base station 28$_f$ to another node for modification or construction of a neighbor list by the other node, as depicted by step 4D-5 in FIG. 4D the femto radio base station 28$_f$ uses the neighbor data structure 59B which it has just built as the neighbor list. In this regard, FIG. 3C also shows as step 4D-5 the neighbor data structure 59B built by neighbor data structure builder 58B being utilized or transmitted to UE measurements list manger 57. Step 4D-8 illustrates subsequently transmission of the neighbor list (taken from neighbor data structure 59B) from femto radio base station 28$_f$ to a user equipment unit 30 served by the femto radio base station.

Thus, as illustrated by the mode of FIG. 4D, if desired, the neighbor data structure as built by the femto radio base station can be used as the neighbor list for transmission to the user equipment unit served by the femto radio base station. The foregoing principle/method can also be applied for radio technologies other than WCDMA, which is illustrated only as an example. Other suitable technologies include but are not limited to GSM, CDMA, WiMAX etc. The technology has particular relevance of the aforementioned and conveniently described system and scenarios, but could also be applied in other cases and for other networks.

Although various embodiments have been shown and described in detail, the claims are not limited to any particular embodiment or example. None of the above description should be read as implying that any particular element, step, range, or function is essential. The invention is not to be limited to the disclosed embodiment, but on the contrary, is intended to cover various modifications and equivalent arrangements.

What is claimed is:

1. A method of operating a radio access network comprising:

using a resident radio receiver at a femto radio base station to acquire, over a radio interface, system information broadcast in a radio access network by scanning a surrounding macro coverage area of the femto radio base station for obtaining cell identify information for detected cells;

using at least part of the system information for building, at the femto radio base station, a neighbor data structure comprising information for neighboring cells and adding the cell identity information to the neighbor data structure;

measuring a signal strength for each detected cell to the neighbor data structure;

adding a measured value of the signal strength for each detected cell to the neighbor data structure;

transmitting the neighbor data structure, including the cell identity information and measured values for each detected cell, from the femto radio base station to a network node other than the femto radio base station and using the neighbor data structure for building a neighbor list at the other node;

transmitting the neighbor list to the femto radio base station that measured the signal strength for the detected cells; and transmitting the neighbor list from the femto radio base station over the radio interface to a user equipment unit served by the femto radio base station.

2. The method of claim 1, wherein the step of transmitting the neighbor list from the femto radio base station to the user equipment unit served by the femto radio base station comprises broadcasting the neighbor list to user equipment units served by the femto radio base station which are in idle mode.

3. The method of claim 1, wherein the step of transmitting the neighbor list from the femto radio base station to the user equipment unit served by the femto radio base station comprises using a dedicated signaling connection for sending the neighbor list as a monitored set to user equipment units served by the femto radio base station which are in active mode or connected mode.

4. The method of claim 1, wherein the other node is a radio network controller node.

5. The method of claim 1, wherein the other node is a backend system node.

6. A method of operating a radio access network comprising:

using a resident radio receiver at a femto radio base station to acquire, over a radio interface, system information broadcast in a radio access network;

using at least part of the system information for building, at the femto radio base station, a neighbor data structure comprising information for neighboring cells;

reporting the neighbor data structure from the femto radio base station to a network node other than the femto radio base station and the network node other than the femto radio base station using the neighbor data structure for building a neighbor list at the other node;

transmitting the neighbor list to the femto radio base station;

transmitting the neighbor list from the femto radio base station over the radio interface to a user equipment unit served by the femto radio base station;

wherein using the neighbor data structure for building the neighbor list comprises at least one of the following:

filtering at least one cell from the neighbor data structure; and replacing at least one cell of the neighbor data structure with a replacement cell.

7. A method of operating a radio access network comprising:

using a resident radio receiver at a femto radio base station to acquire, over a radio interface, system information broadcast from a camped-on cell in a radio access network;

using at least part of the system information for building, at the femto radio base station, a neighbor data structure comprising information for neighboring cells, the building of the neighbor data structure comprising:

adding cell identity information and a signal strength measurement for the camped-on macro cell to the neighbor data structure;

using at least one system information block in the camped-on macro cell for obtaining information about a neighboring cell;

adding cell identity information and signal strength measurement for the neighboring cell to the neighbor data structure;

using the neighbor data structure for building a neighbor list;

transmitting the neighbor list from the femto radio base station over the radio interface to a user equipment unit served by the femto radio base station.

8. The method of claim 7, further comprising using the neighbor data structure as built by the femto radio base station as the neighbor list.

9. The method of claim 7, further comprising:

reporting the neighbor data structure to a network node other than the femto radio base station and using the neighbor data structure for building a neighbor list at the other node;

transmitting the neighbor list to the femto radio base station.

10. A femto radio base station comprising:

a resident radio receiver arranged for scanning a surrounding macro coverage area of the femto radio base station for obtaining system information comprising cell identity information for detected cells, the resident radio receiver being further arranged to camp on a macro cell for obtaining: (1) cell identity and a signal strength measurement for the camped-on macro cell; (2) system information block in the camped-on macro cell for obtaining information about at least one neighboring cell, the system information block providing a cell identity of a neighboring cell of the camped-on macro cell so that the femto radio base station does not have to scan for the neighboring cell; and (3) signal strength measurements including a signal strength measurement for the camped-on macro cell;

a neighbor data structure builder arranged for using at least part of the system information for building a neighbor data structure comprising information for neighboring cells, the neighbor data structure builder being arranged to include in the neighbor data structure the cell identity information for detected cells and for using (1) and (2) and (3) for building the neighbor data structure.

11. The apparatus of claim 10, further comprising a list manager arranged for using the neighbor data structure as built by the neighbor data structure builder of the femto radio base station as the neighbor list for transmission to a user equipment unit served by the femto radio base station.

\* \* \* \* \*

UNITED STATES PATENT AND TRADEMARK OFFICE
CERTIFICATE OF CORRECTION

PATENT NO.         : 8,107,964 B2
APPLICATION NO.    : 11/538077
DATED              : January 31, 2012
INVENTOR(S)        : Nylander et al.

It is certified that error appears in the above-identified patent and that said Letters Patent is hereby corrected as shown below:

In Column 1, Line 8, delete "State" and insert -- States --, therefor.

In Column 7, Line 48, delete "CM." and insert -- $C_M$. --, therefor.

In Column 12, Line 12, delete "$26_1$," and insert -- $26_1$ --, therefor.

In Column 13, Line 56, delete "$26_1$," and insert -- $26_1$ --, therefor.

Signed and Sealed this
Nineteenth Day of June, 2012

David J. Kappos
*Director of the United States Patent and Trademark Office*